Figure 1:
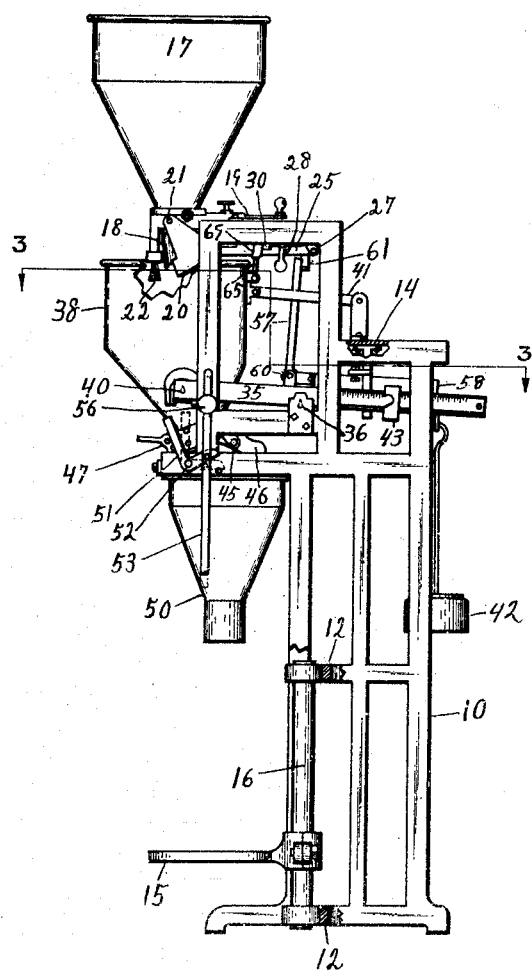

R. J. ZANONE.
AUTOMATIC SCALE
APPLICATION FILED MAR. 1, 1920.

1,368,778.

Patented Feb. 15, 1921.
3 SHEETS—SHEET 1.

Inventor
Richard J. Zanone,
By O. B. Munnell.
Attorney

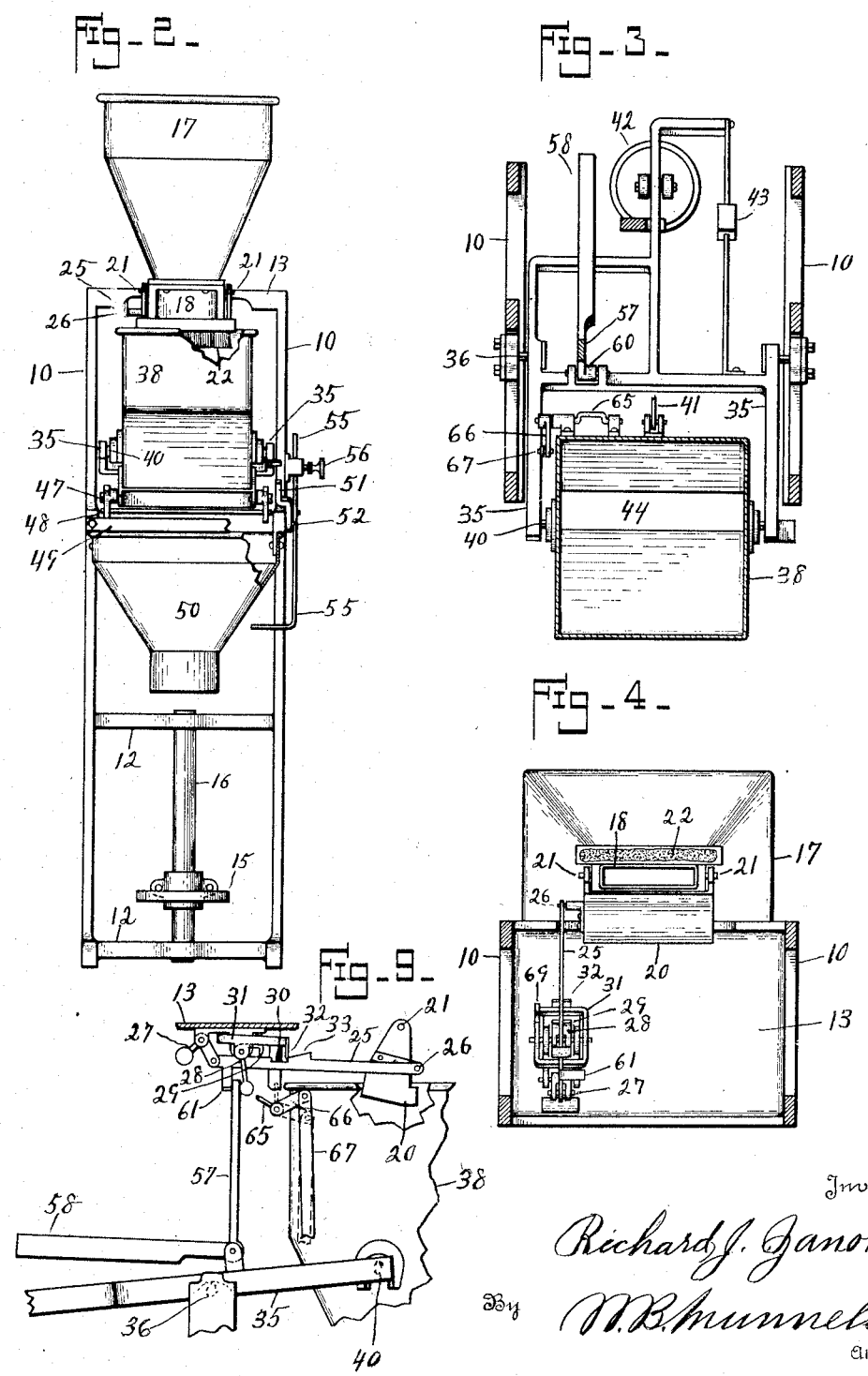

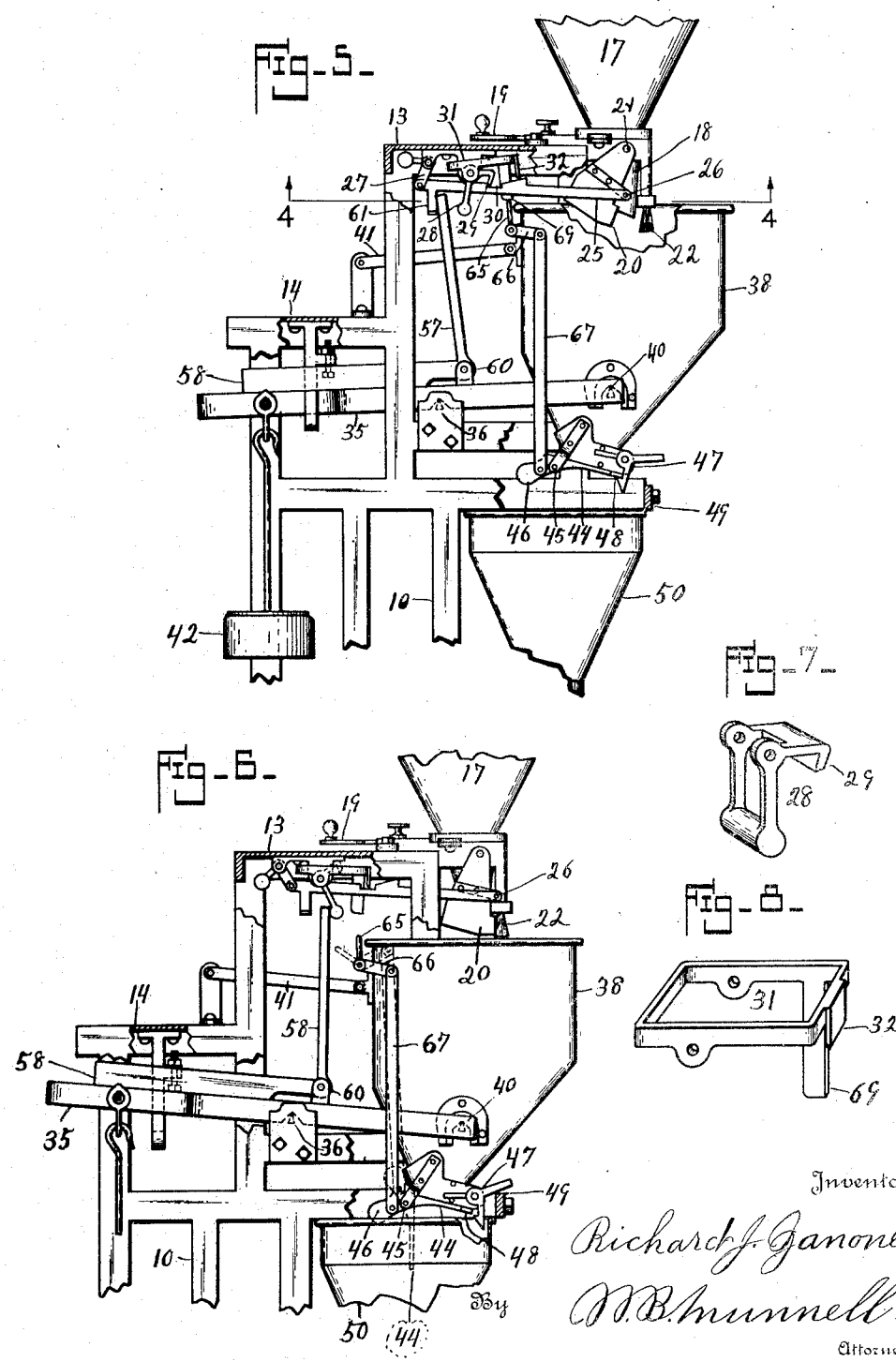

UNITED STATES PATENT OFFICE.

RICHARD J. ZANONE, OF NEW ALBANY, INDIANA, ASSIGNOR TO WEIGHING MACHINE MFG. CO., OF LOUISVILLE, KENTUCKY, A CORPORATION.

AUTOMATIC SCALE.

1,368,778.　　　　　Specification of Letters Patent.　　Patented Feb. 15, 1921.

Application filed March 1, 1920. Serial No. 362,231.

*To all whom it may concern:*

Be it known that I, RICHARD J. ZANONE, a citizen of the United States, residing at New Albany, county of Floyd, and State of Indiana, have invented certain new and useful Improvements in Automatic Scales, of which the following is a specification.

This invention relates to scales adapted to weigh commodities of various classes either continuously or intermittently.

It consists of novel features and parts, and combinations fully described hereinafter, and an object is to provide a device as characterized which will be durable in service, economical in construction and efficient in operation.

With the foregoing and other objects in view, the invention consists of the novel construction and arrangement of parts illustrated in the accompanying drawings, comprising three sheets, wherein is set forth an embodiment of the invention, but it is to be understood that such changes and modifications may be resorted to as come within the scope of the appended claims.

In the drawings, comprising three sheets, wherein similar reference characters designate like parts in the several views, Figure 1, is a side elevation of an embodiment of the invention, showing the various parts in normal position, *i. e.* ready to receive a commodity to be weighed, portions being broken away: Fig. 2, a front elevation of Fig. 1, the mechanism being set to allow the bottom of the weighing hopper to be automatically released for continuous weighing: Fig. 3, a section on line 3—3 of Fig. 1: Fig. 4, a section on line 4—4 of Fig. 5: Fig. 5, a side view of the upper portion partly in elevation and partly in section, showing the parts as in Figs. 1 and 2: Fig. 6, a similar view to Fig. 5, showing the weighing hopper borne down by a contained weighed portion, the feed gate closed and the hopper bottom shown closed in full lines and open in dotted lines: Figs. 7 and 8 are perspective views respectively of the dogs which hold the feed gate open and closed: Fig. 9, a view similar to Fig. 6, showing the position of the parts when the weighing hopper rises after being lightened of a portion of its contents, the feed gate remaining closed as long as the bottom of the hopper is held open by the out flowing commodity.

In the embodiment of the invention illustrated, a frame —10— is provided which consists of side members connected by suitable transverse members —12— and by tops or shelves —13 and 14—. A shelf —15—, adjustably positioned on a vertical rod —16— carried by the transverse members 12, is provided for the purpose of supporting containers into which weighed portions are discharged. A supply hopper —17— supported by the frame discharges through a chute —18— and the flow of commodity therethrough is controlled, or regulated by means of an adjustable cut off slide —19—. A feed gate —20—pivoted at —21— serves to close the lower end of the chute, closing against a brush —22—. A bar —25— pivotally connected to the feed gate at —26—extends rearwardly to a connection with a weighted bell crank lever —27— which is pivotally suspended from the top 13, the weighted lever assisting in closing the feed gate. The feed gate is held open by means of a gravity actuated catch, or dog —28— which is pivotally suspended from the top 13, a toe —29— of which engages in a notch —30— in the bar 25. When the gate is closed a catch, or dog —31— serves to hold it, a toe —32— thereof engaging in the notch 30, in the bar. The dogs 28 and 31 are co-axially mounted the one within the other. When the gate is open the toe of the dog 31 rests upon an incline —33— on the bar. A scale beam —35— is pivotally mounted upon the frame at —36—, and a weighing hopper —38— is pivotally supported upon the forward end of the scale beam between bifurcated arms thereof by means of pivots —40— and is constrained to move in vertical planes by means of a distance rod —41—. Counter balance weights —42— are suitably suspended from the scale beam which is provided with a sliding poise weight —43—. The weighing hopper is provided with a drop bottom, or closure —44— which is pivotally supported at —45—. A counter weight —46— serves to return the bottom, when open, to a closed position, in which it is retained, when the hopper is charged, by catches —47— which engage with detents —48— extended from the forward corners of the bottom. The horizontal arms of the catches 47, extend forward in position to contact with a transverse bar —49— as the hopper descends, and release the bottom. A delivery funnel —50— is suitably supported below the weighing hopper in position to receive commodity discharged therefrom. An angular lever —51— is pivoted at —52— on a side of the frame in such position that normally its vertical arm will lie in the path of the forward end of the scale beam and arrest its downward movement before the catches 47 contact with the bar 49. The horizontal arm of the catch is operatively connected with a vertical sliding bar —53— which may be secured in an adjusted position by means of a set screw —56—, whereby it may be shifted to permit the hopper to descend and discharge. With the lever 51 in position shown in Fig. 1, the catches 47 will contact with the bar 49 on every descent of the hopper and the weighing operation will proceed continuously, or as long as commodity is furnished (see Fig. 6). In operation, the poise is set at the amount it is desired to weigh, a commodity is conducted from a suitable source of supply to the receiving hopper from whence it flows into the weighing hopper, the flow being regulated by the cut-off slide 19. When the weighing hopper has received a quantity sufficient to counterbalance the weights, it will descend, as it does so a vertical arm —57— which is pivoted upon the scale beam at —60—, forward of the pivotal point 36, moves away from a leg —61— which depends from the arm 25, this would permit the feedgate to close but that it is restrained by the dog 28. The arm 57, is biased in its movement by an integral horizontal weighted arm —58— which normally lies upon the scale beam. It is to be observed that at the moment the scale beam is in equilibrium it and the weighing hopper are free from contact or connection with any actuating or controlling means which would retard their movement, or influence the accuracy of the weighing operation. As the hopper passes below the horizontal, the arm 57, moves forward coming into contact with the depending weighted arm of the dog 28, lifting the toe 29 thereof out of the notch 30 in bar 25, thus permitting the gate to close and shutting off the flow of commodity into the weighing hopper. As the gate closes the toe 32, of the dog 31 drops into the notch 30, in the bar 25, and holds the gate closed. When the catches 47 are released by contact with the bar 49, the weight of the contained commodity causes the drop bottom to open, the outflowing commodity holding it open. When lightened by escape of a portion of its load, the weighing hopper returns to its normal elevated position (see Fig. 9). As the hopper rises the weighted arm 58, of the arm 57, which has been raised off of the scale beam tends to open the feed gate but the dog 31 restrains. A shaft mounted in bearings on the rear of the weighing hopper, near the top thereof, has a looped projection —65— and an arm —66— which latter is connected by means of a rod —67— with the arm on the drop bottom which carries the weight 46. The arrangement is such that as long as the bottom is open the projection 65 will lie in an inclined position such that it will contact with a leg —69— which depends from the dog 31, when the hopper rises, but when the drop bottom closes the projection 65 will be turned to a vertical position and will contact with the leg 69 and raise the dog 31, disengaging the toe 32, thereof from the notch thereby allowing the weight 58, acting through the arm 57, on the leg 61 of the bar 25, to open the feed gate. It will be observed that with the lever 51 interposed in the path of the scale beam, single packages may be weighed and that with it removed therefrom the weighing will proceed continuously and automatically.

Having thus described my invention so that those skilled in the art pertaining thereto can make and use the same.

I claim:

1. In a scale, a frame, a scale beam, a weighing hopper suspended therefrom, a chute for delivering commodity to said hopper, a gate for said chute, a weighted lever suspended from said frame, a bar operatively connecting said lever and the gate, an angular lever pivoted on the scale beam forward of its fulcrum, one arm standing substantially perpendicular to the beam the other arm being weighted, and a projection on said bar with which the perpendicular arm contacts to open the gate.

2. In a scale, a frame, a scale beam, a weighing hopper suspended therefrom, a chute for delivering commodity to said hopper, a gate for said chute, a weighted lever suspended from said frame, a bar operatively connecting said lever and the gate, an angular lever pivoted on the scale beam forward of its fulcrum, one arm standing substantially perpendicular to the beam, the other arm being weighted, a projection on said bar with which the perpendicular arm contacts to open the gate, and a catch on the frame adapted to engage with the bar to hold the gate open, the perpendicular arm engaging therewith on the downward movement of the hopper to release it and to permit the gate to close.

3. In a scale, a frame, a scale beam, a weighing hopper suspended therefrom, a chute for delivering commodity to said hopper, a gate for said chute, a weighted lever suspended from said frame, a bar operatively connecting said lever and the gate, an arm pivoted on the scale beam forward of its fulcrum point and standing substantially perpendicular relative thereto and having a limited movement relative thereto, means biasing said arm in one direction, a projection on said bar with which the arm contacts to open the gate.

4. In a scale, a frame, a scale beam, a weighing hopper suspended therefrom, a chute for delivering commodity to said hopper, a gate for said chute, a weighted lever suspended from said frame, a bar operatively connecting said lever and the gate, an arm pivoted on the scale beam forward of its fulcrum point, said arm standing substantially perpendicular and having a limited movement relative to the beam, means biasing said arm in one direction, a projection on said bar with which the arm contacts to open the gate, and a catch on the frame adapted to engage with the bar to hold the gate open, the arm adapted to contact with and release said catch on the downward movement of the hopper.

5. In a scale, a frame, a scale beam, a weighing hopper suspended therefrom, a chute for delivering commodity to said hopper, a gate for said chute, a weighted lever suspended from said frame, a bar operatively connecting said lever and the gate, an angular lever pivoted on the scale beam forward of its fulcrum point, one arm standing substantially perpendicular to the beam, the other arm being weighted, a projection on said bar with which the perpendicular arm contacts, to open the gate, a catch on the frame adapted to engage with the bar to hold the gate open, the perpendicular arm engaging therewith on the downward movement of the hopper to release it and permit the gate to close, a catch adapted to hold the gate closed, and means associated with the hopper adapted on the upward travel thereof to release the last mentioned catch.

6. In a scale, a frame, a scale beam, a weighing hopper suspended therefrom, a chute for delivering commodity to said hopper, a gate for said chute, a closure for said hopper, catches associated with the frame and adapted respectively to hold said gate open and to hold it closed, means erected on the beam forward of its fulcrum point adapted to release a catch and permit the gate to close, and means associated with the hopper and controlled by the closure thereof to release the other catch and permit the gate to be opened.

7. In a scale, a frame, a scale beam, a weighing hopper suspended therefrom, a chute for delivering material to said hopper, a gate for said chute, a closure for the hopper, a lever, a bar operatively connected with said lever and with the gate, a catch adapted to be engaged with the bar to hold the gate open, another catch adapted to be engaged with the bar to hold the gate closed, means biased in one direction erected on the beam forward of its fulcrum point and adapted during the downward movement of the hopper to release the first mentioned catch and permit the gate to close and means associated with the hopper and controlled by the closure thereof to release the second mentioned catch and permit said biased means to open the gate.

RICHARD J. ZANONE.